United States Patent [19]

Nobbe

[11] 4,183,324

[45] Jan. 15, 1980

[54] CONCRETE SLOTTED FLOOR INCLUDING WOODEN INSERT

[76] Inventor: Paul J. Nobbe, R.R. 2, Brookville, Ind. 47012

[21] Appl. No.: 936,704

[22] Filed: Aug. 25, 1978

Related U.S. Application Data

[60] Division of Ser. No. 817,847, Jul. 21, 1979, which is a continuation-in-part of Ser. No. 763,844, Jan. 31, 1977, which is a continuation of Ser. No. 542,167, Jan. 20, 1975, which is a division of Ser. No. 457,068, Apr. 1, 1974, Pat. No. 3,915,422.

[51] Int. Cl.$^2$ .................... A01K 1/015; A01K 1/02
[52] U.S. Cl. .................................. 119/20; 119/28
[58] Field of Search ..................... 119/28, 20, 16

[56] References Cited

U.S. PATENT DOCUMENTS

| 528,849 | 11/1894 | Brown et al. | 119/28 |
|---|---|---|---|
| 3,228,376 | 1/1966 | Conover | 119/28 |
| 3,905,334 | 9/1975 | Stevenson | 119/20 |

*Primary Examiner*—Hugh R. Chamblee

*Attorney, Agent, or Firm*—Woodard, Weikart, Emhardt & Naughton

[57] ABSTRACT

A method and mold for producing a concrete slotted floor for supporting animals. The mold includes a bottom part with a smooth top surface with lengthwise extending ridges formed thereon. The top part of the mold locks to the bottom part and includes a plurality of parallel slab separators seatable upon the ridges. The top part includes end walls and side walls defining an enclosure for receiving the poured concrete. The slab separators are spaced apart from the end walls allowing the concrete to extend completely around each separator to form integrally joined concrete slabs. Concrete is poured into the top part of the mold between each separator and across the ends of the separators. The mold is vibrated and the concrete is allowed to solidify. The top part of the mold is then lifted upwardly and the solidified concrete is removed and turned over in order that the smooth surface of the concrete contacting the bottom part of the mold faces upwardly. In the preferred embodiment, a wooden insert is removably mounted to the concrete slotted floor and positioned in an upwardly facing recess formed in the floor during the molding thereof.

2 Claims, 15 Drawing Figures

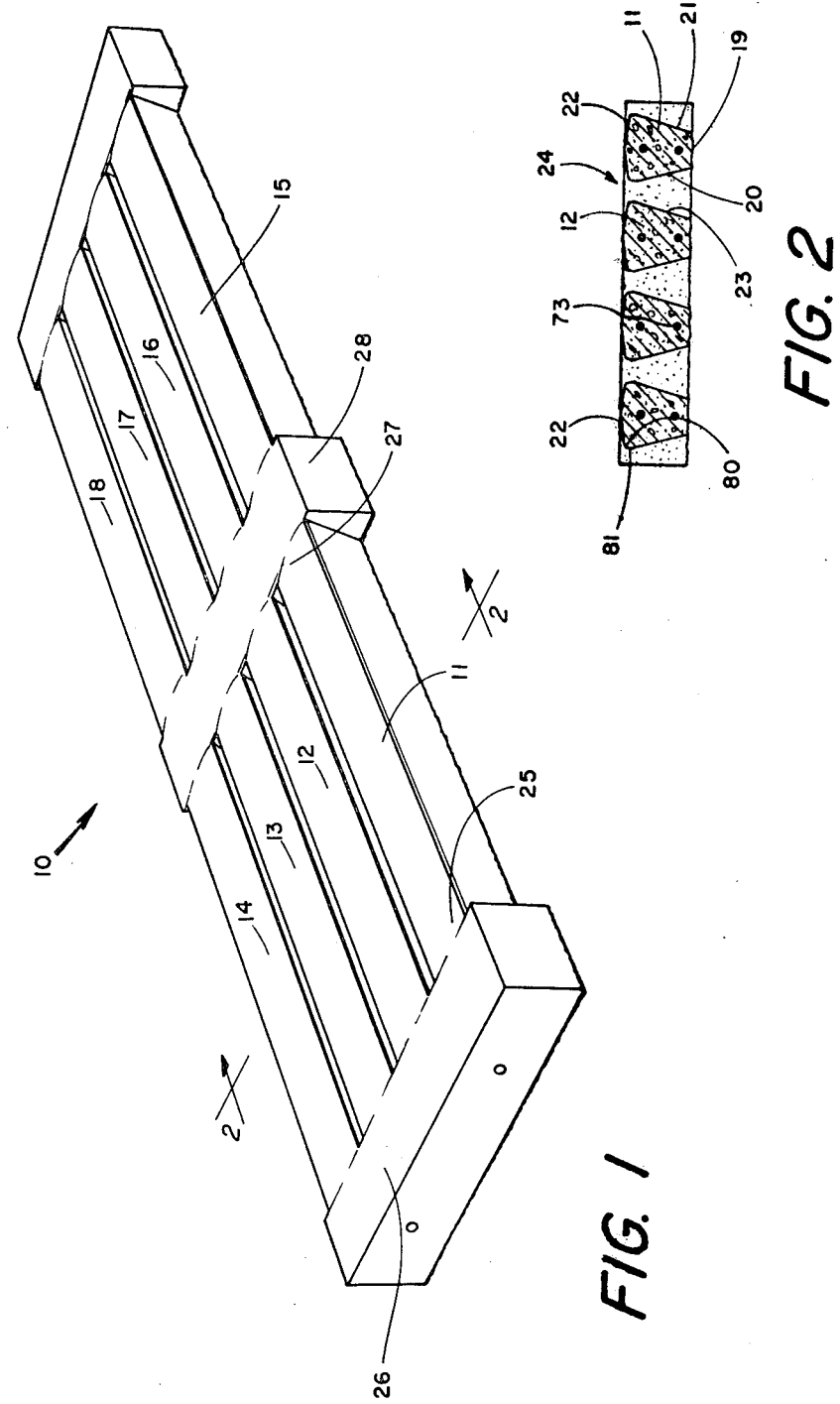

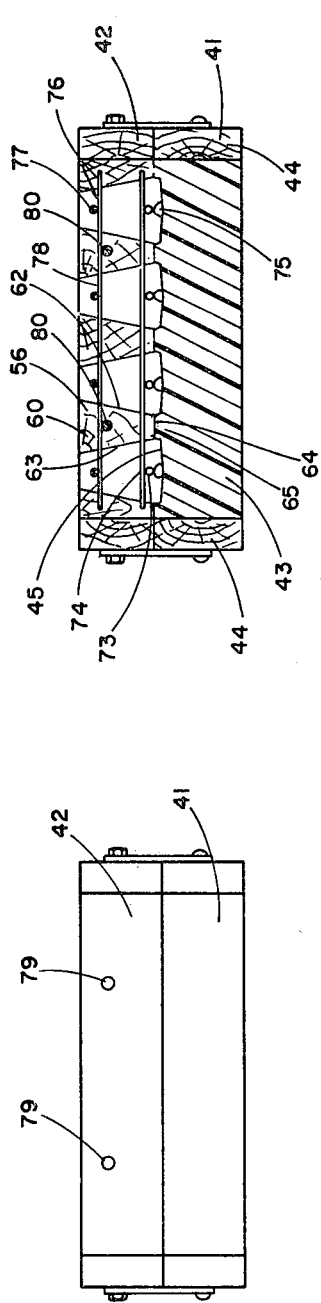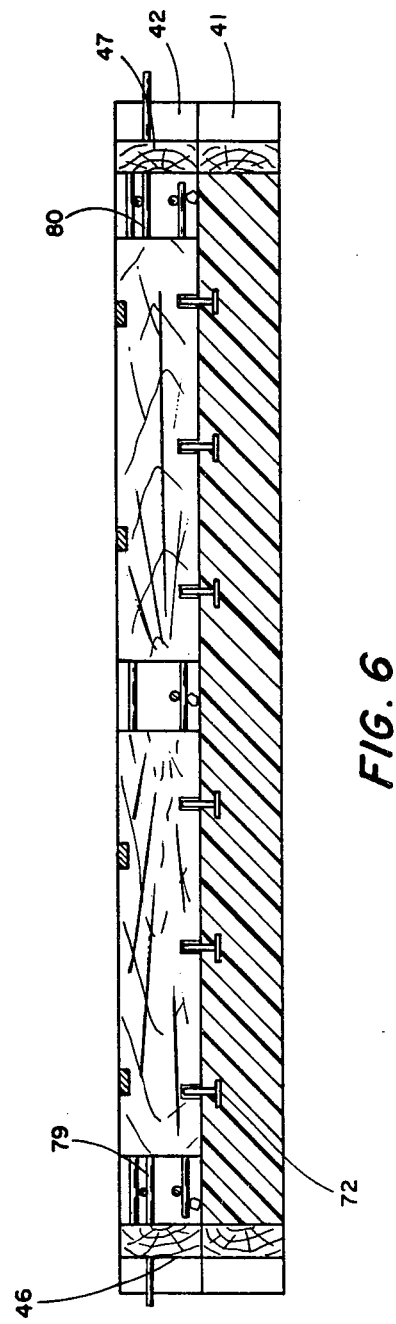

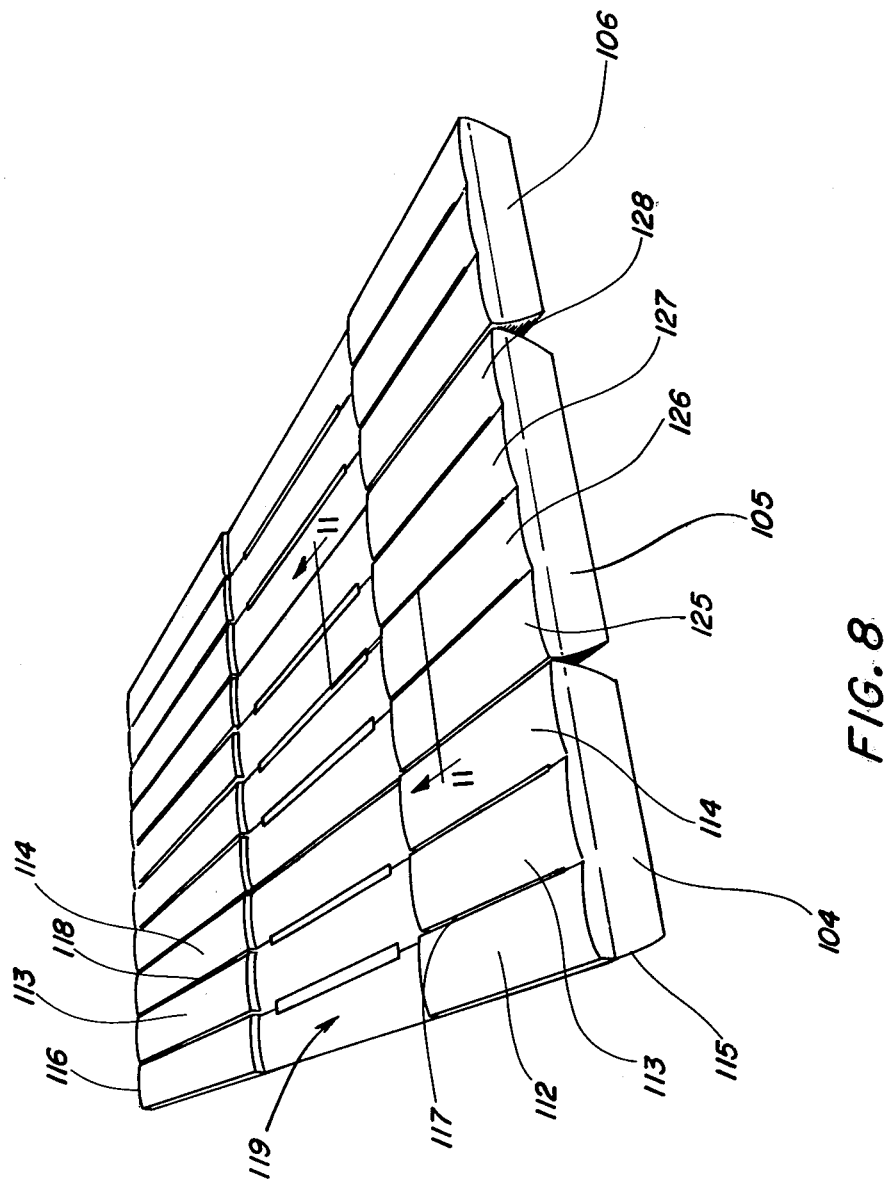

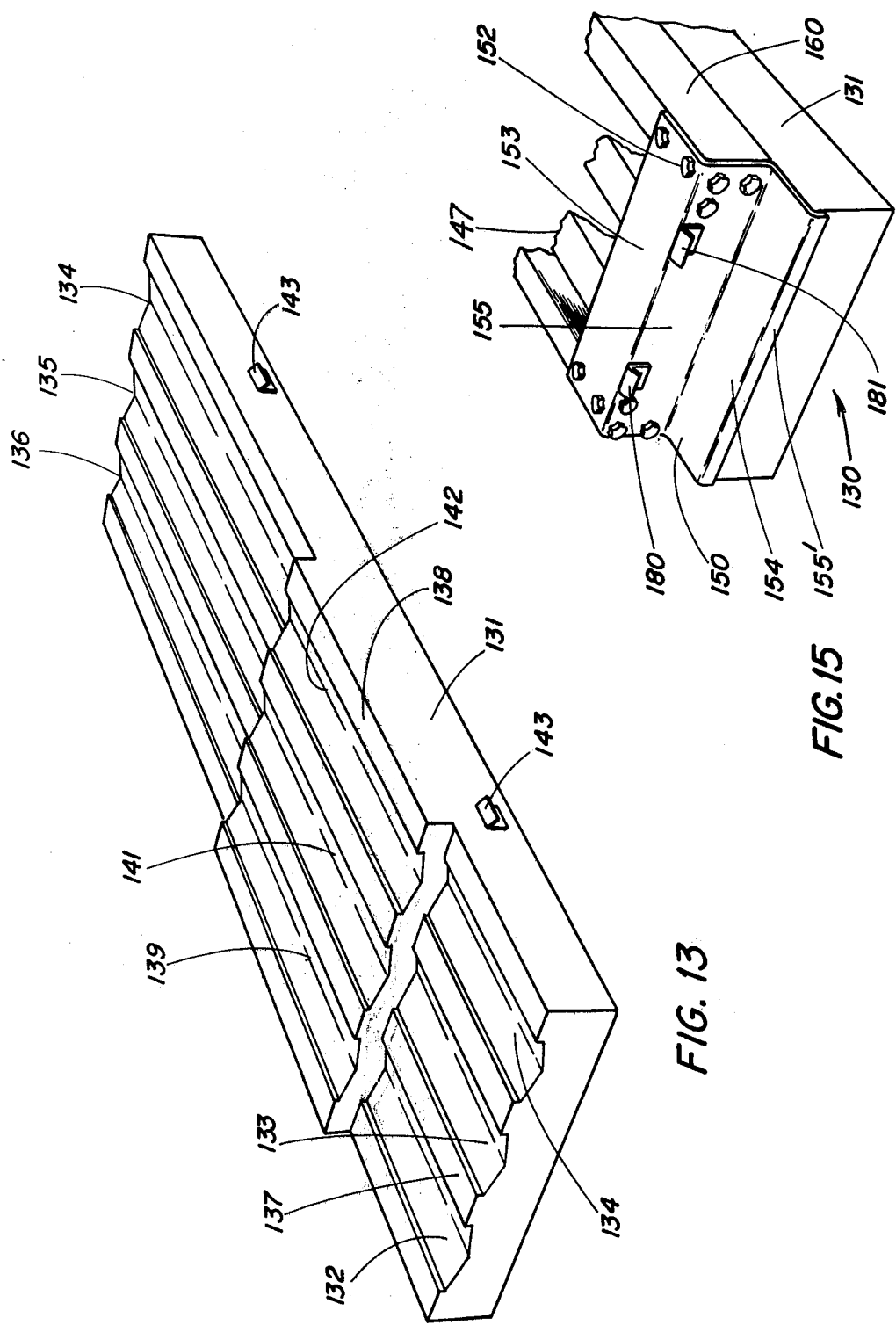

CONCRETE SLOTTED FLOOR INCLUDING WOODEN INSERT

REFERENCE TO RELATED APPLICATION

This application is a division, of application Ser. No. 817,847, filed July 21, 1979 which is a continuation-in-part of my U.S. patent application, Ser. No. 763,844, filed Jan. 31, 1977 which is a continuation of my U.S. patent application, Ser. No. 542,167, filed Jan. 20, 1975, in turn a divisional of U.S. Pat. application Ser. No. 457,068, filed Apr. 1, 1974 now U.S. Pat. No. 3,915,422.

BACKGROUND OF THE INVENTION

1. Field of the Invention

This invention relates to concrete slotted animal floor constructions.

2. Description of the Prior Art

The use of concrete slabs in parallel spaced relationship to form a slotted floor for supporting animals is well known. The slabs are spaced apart to allow for the animal droppings to pass therethrough to a pit or ditch located beneath the floor. Various methods have been used to construct the slotted floor. Common method is to produce the concrete slabs one at a time and then to manually space the slabs apart. The slabs are then mortised together so as to form a unified construction. The increased labor time and expense required to mortise the slabs together is an undesirable feature. Time is required not only to mortise the slabs together but also to correctly space the slabs apart. The floor structure disclosed in U.S. Pat. No. 3,626,904, issued to Edward J. Hatten, utilizes precast concrete slabs having protrusions formed thereon to allow the slabs to be self-spacing; however, the slabs must still be mortised together. In the U.S. Pat. No. 3,228,376, issued to W. J. Conover, there is disclosed precast concrete slabs which are connected together by metal straps. Two other patents of interest in this field are the U.S. Pat. No. 3,360,230 issued to A. B. Clements et al, and U.S. Pat. No. 2,275,080, issued to W. Kelly. Disclosed herein is a new method and mold for simultaneously forming a plurality of concrete slabs which are spaced apart but integrally joined together at their opposite ends. The U.S. Pat. Nos. 1,460,232, issued to Ditto and 1,458,054 issued to Hemphill disclose other methods for forming concrete slabs.

It is desirable for the concrete slabs to have a smooth top surface thereby allowing for the easy removal of the animal droppings from the slabs. In order to obtain the smooth top surface for each slab, it has been the practice to manually smooth the top surface of each slab prior to solidification of the concrete. This smoothing operation increases the labor time required to produce each slab and, as a result, is undesirable due to the increased cost. In the U.S. Pat. No. 3,455,279, issued to R. R. Krevit, the slabs are poured upside down with a rubber pad positioned in the bottom of the mold thereby being attached to the slab allowing for a smooth top surface of the slab when removed from the mold. The Krevit slabs subsequent to solidification are mortised together. A problem with the prior art floor construction is the relatively low strength of long slabs. Long slabs will bow apart intermediate the slab ends thereby allowing the animal, such as a hog, to catch its foot between slabs. The floor construction disclosed herein is provided with center strengthening ribs which prevent the slabs from bowing apart.

Various buildings have been devised to facilitate the nursing of young pigs. Typically, such construction includes a concrete floor with a portion of the floor constructed from wood allowing a sow to lay down during nursing. Typically, the wooden portion of the floor eventually rots due to collection of moisture. The wooden portion of the floor must be removed at great effort and expense. Disclosed herein is a farrowing construction which includes a concrete floor having a removable wooden portion. In addition, means are provided to limit movement of the animals upon the wooden insert.

SUMMARY OF THE INVENTION

One embodiment of the present invention is a method of producing a concrete floor having integrally connected slabs for supporting animals comprising the steps of providing a bottom mold having a smooth top surface extending thereacross, mounting a top mold havig longitudinally extending spacers atop the bottom mold so the spacers contact the smooth top surface, placing first metal rods between the spacers, placing second metal rods perpendicular to the first rods and at ends of the spacers, pouring concrete between the spacers to form slabs and across ends of the spacers to integrally join the slabs, allowing the concrete to solidify, lifting the top mold off the bottom mold, and removing the solidified concrete from the bottom mold and turning the solidified concrete over so the concrete in contact with the smooth top surface faces upwardly.

Another embodiment of the present invention is a farrowing construction comprising a pit, a plurality of concrete floor sections to support animals, each of the sections having a plurality of concrete slats with first convex top crowns, the slats being spaced apart by slots to allow animal droppings to pass through the slots and with the slats having portions integrally joined to adjacent slats, the floor sections extending longitudinally across the pit and including upwardly facing recesses located below the crowns, a plurality of wooden inserts removably mounted to the floor sections and positioned in the recesses upon which animals may be located during nursing, first means located above the floors to limit movement of some of said animals atop said inserts, and second means cooperating with the inserts and the floors to limit relative movement therebetween.

A further embodiment of the present invention is a mold for producing a floor with a top and having integrally joined concrete slabs for supporting animals comprising a bottom part with a top surface extending thereacross to form the top of the floor, the bottom part including a plurality of longitudinally extending ridges extending upwardly from the top surface, the bottom part includes a first separate concave recess formed in the top surface between each of the ridges, the bottom part includes a plateau extending above the concave recess, top means removably mounted atop the bottom part, the top means includes a pair of side walls and end walls forming an enclosure for holding poured concrete, the top means further includes spaced apart slab separators having an elongated configuration extending in the direction of the side walls, the separators are spaced from the end walls allowing concrete to extend completely around each separator forming the integrally joined concrete slabs, each separator has a bottom end contacting the ridges of the bottom part and opposite side surfaces diverging from the bottom end allowing the separators to be withdrawn upon solidification of concrete within the mold and surrounding the separators, locating means cooperating with the bottom part to align the ridges with the separators.

It is an object of the present invention to provide a new and improved method for producing a concrete slotted floor for supporting animals.

A further object of the present invention is to provide a new and improved mold for producing a concrete slotted floor for supporting animals.

Yet another object of the present invention is to provide a method and mold for producing a concrete floor having integrally joined spaced apart slabs.

In addition, it is an object of the present invention to provide a method and mold for producing a new type of farrowing construction having a removable wooden floor insert.

Related objects and advantages of the present invention will be apparent from the following description.

BRIEF DESCRIPTION OF THE DRAWINGS

FIG. 1 is a perspective view of a concrete slotted floor produced by the method and mold disclosed herein.

FIG. 2 is a cross-sectional view taken along the line 2—2 of FIG. 1 and viewed in the direction of the arrows.

FIG. 5 is an end view of the mold shown in FIG. 4.

FIG. 6 is a cross-sectional view taken along the line 6—6 of FIG. 4 and viewed in the direction of the arrows.

FIG. 7 is a cross-sectional view taken along line 7—7 of FIG. 4 and viewed in the direction of the arrows.

FIG. 8 is a perspective view of the preferred embodiment of a concrete slotted floor provided with a recess to receive a wooden insert.

FIG. 13 is a perspective view of the bottom part of the mold shown in FIG. 12.

FIG. 15 is a fragmentary perspective view of the mold shown in FIG. 12.

DESCRIPTION OF THE PREFERRED EMBODIMENTS

Figure 3:
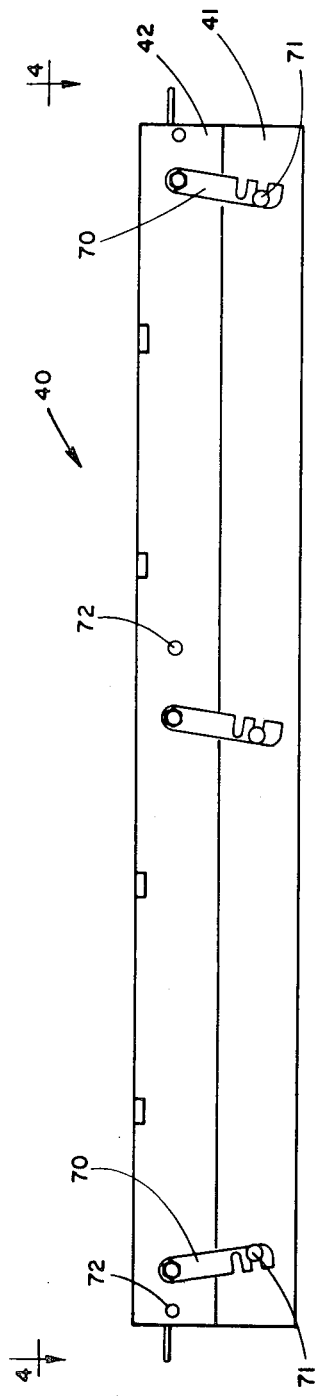
FIG. 3 is a side view of the mold incorporating the present invention and which is used to produce the floor shown in FIG. 1.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a concrete slotted floor 10 for supporting animals. Floor 10 includes four parallel concrete and spaced apart slabs 11 through 14 integrally joined together and integrally joined and aligned with four additional parallel slabs 15 through 18. Slab 11 will now be described it being understood that a similar description applies to the remaining seven slabs.

Slab 11 (FIG. 2) has a rough bottom surface 19 with a pair of diverging side surfaces 20 and 21 extending upwardly therefrom to a convex top surface 22. Surface 20 of slab 11 is spaced apart from surface 23 of slab 12 forming a gap 24 for receiving animal droppings. Gap 24 increases in width from the top surfaces of the slabs to the bottom surfaces of the slabs.

End 25 of slab 11 is integrally joined to slabs 12 through 14 by a concrete cross portion 26. Likewise, end 27 of slab 11 is integrally joined to the opposite ends of slabs 12 through 14 and to the ends of slabs 15 through 18 by concrete cross portion 28.

Mold 40 (FIG. 3) is used to produce floor 10 and includes a bottom part 41 and a top part 42. Bottom part 41 (FIG. 7) may be produced from concrete within a wood frame with a layer of fiber glass forming a smooth top surface for bottom part 41. Likewise, bottom part 41 (FIG. 7) may be produced entirely from fiber glass 43 within a wood frame 44 with the top surface 45 of bottom part 41 being smooth. The important feature of part 41 is that the top surface 45 be completely smooth for forming the top smooth surface of the slotted floor. The term smooth surface as used herein also includes a textured surface.

Top part 42 is removably mounted atop bottom part 41 and includes a pair of end walls 46 and 47 (FIG. 4) connected to side walls 48 and 49. Walls 46 through 49 may be produced from wood and form an enclosure for holding poured concrete. A plurality of spaced apart slab separators 50 through 54 are arranged in a first group with additional separators 55 through 59 being arranged in a second group. The separators extend in the direction of side walls 48 and 49 and are spaced from end walls 46 and 47 allowing the poured concrete to completely extend around each separator 51 through 53 and 56 through 58 forming the integrally joined concrete slabs. The mutually facing ends of separators 50 through 54 are spaced apart from separators 55 through 59 and are aligned therewith. All separators are parallel.

Separator 56 will now be described it being understood that a similar description applies to separators 51 through 53 and 57 through 58. Separator 56 (FIG. 7) includes a top end 60 fixedly secured to metal band 61 (FIG. 4) having opposite ends mounted to side walls 48 and 49. The side surfaces 62 and 63 of separator 60 converge downwardly to bottom end 64 which is removably seated atop upraised portion or ridge 65 of bottom part 41.

Bottom part 41 has a plurality of lengthwise extending ridges upon which the separators are seated. The ends of separators 50 through 54 are spaced apart from the ends of separators 55 through 59 allowing the concrete to be poured between the first group of separators and the second group of separators. Separators 50 and 55 are fixedly attached to side wall 49 whereas separators 54 and 59 are attached to side wall 48. As shown in FIG. 7, the top surface of bottom part 41 is concave between the ridges or between the separators thereby providing the convex top surface 22 as shown in FIG. 2 for the concrete slabs.

A plurality of members 70 (FIG. 3) are pivotally mounted to the top part of the mold having a slotted bottom end to slidably receive projections 71 for locking parts 41 and 42 together. Additional projections 72 are provided on part 42 thereby allowing members 70 to be swung upwardly so as to unlock parts 41 and 42 and to rest upon projections 72 when not in use.

As previously discussed, the top surface 45 of bottom part 41 is formed by fiber glass so as to provide a smooth surface. The separators and side and end walls of top part 42 may be produced from wood with bands 61 being metal. A plurality of upstanding pins 72 (FIG. 2) project through ridges 65 and are received by complementary shaped holes provided in the separators thereby locating part 42 with respect to part 41. If desired, pins 72 may be located only on the two outermost ridges.

The method of producing the concrete floor includes providing a bottom mold having a smooth top surface extending thereacross. A metal rod 73 (FIG. 7) is then placed between each separator and extends the length of the mold from end wall 46 to end wall 47. Additional metal rods 74 are then welded perpendicular to rods 73 with rods 74 being positioned between end wall 46 and the ends of separators 50 through 54, between end wall 47 and the ends of separators 55 through 59 and between the mutually facing ends of the first group of separators 50 through 54 and the second group of separators 55 through 59. The resulting metal grid formed is elevated slightly above surface 45 (FIG. 7) by positioning rocks 75 beneath rods 73. A second metal grid 76 is then positioned over the grid formed by rods 73 and 74. Grid 76 includes a plurality of rods 77 positioned between the separators and extending along the lengths of rods 73. Cross metal rods 78 are likewise positioned over rods 74 and are welded to rods 77. Rods 78 are perpendicular to rods 77. Part 42 is then mounted atop part 41 with the upstanding pins 72 projecting into the separators. Members 70 are then locked to projections 71.

The grid 76 formed by rods 77 and 78 is elevated above the grid formed by rods 73 and 74 by inserting rods 79 and 80 through holes extending through end walls 46 and 47. Rods 80 project through end wall 47 and into separators 56 and 58. Likewise, rods 79 project through end wall 46 into separators 51 and 53. The grid formed by rods 76 and 77 is then seated atop rods 79 and 80.

The concrete is then poured into the mold so as to completely surround the metal rods as well as the separators. The mold is then vibrated with the concrete then being allowed to solidify. Rods 79 and 80 are then forcibly withdrawn from the mold and the top part 42 is unlocked from the bottom part 41 and removed therefrom. The solidified concrete is lifted from bottom part 41 and turned over so that the surface of concrete in contact with surface 45 faces upwardly. It is permissible for the bottom surface of the slotted floor to be rough and, as a result, it is unnecessary to smooth the uppermost surface of the concrete when the concrete is positioned within the mold.

A problem with the prior art concrete producing molds is that many of the molds break apart on either side of the individually cast slab thereby providing a dirt collecting seam mark extending the length and on the top surface of the slab. Such a seam is not present on slabs produced in accordance with the present invention.

A shown in FIG. 2, the top edges of each slab are formed by a very small radius and a vertically extending downward portion. Radius 80 and vertical surface 81 (FIG. 2) prevents the edges of each slab from being chipped away by the foot of the animal.

Figure 9:
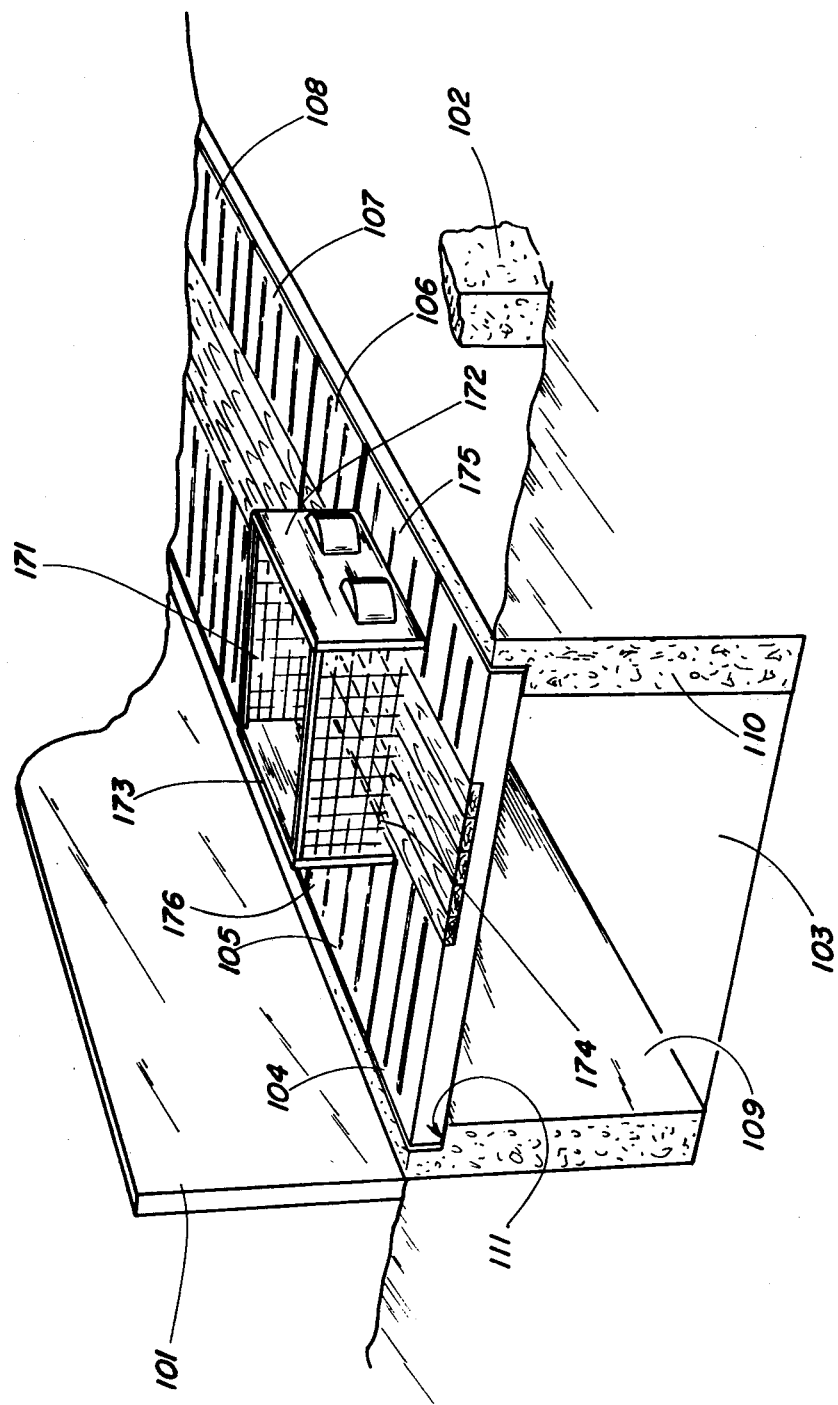
FIG. 9 is a fragmentary perspective view of a farrowing construction showing a plurality of the concrete floors mounted above a pit.

Referring now more particularly to FIG. 9, there is shown a farrowing construction being provided with conventional outer walls 101 and 102 only fragmentarily shown and with a conventional roof. Within the building formed by walls 101 and 102 is a pit 103 for catching the droppings from the animals, such as pigs, positioned atop a plurality of concrete floors positioned in side-by-side fashion. The number of concrete floors utilized would depend upon the length of the particular building. In FIG. 9, concrete floors 104-108 rest atop a pair of poured and parallel concrete columns 109 and 110 positioned upright within pit 103. Each column 109 and 110 is provided with a recess 111 for receiving the opposite ends of the concrete floors. Concrete floors 104, 105 and 106 are shown in FIG. 8 with the wooden inserts removed therefrom. The concrete floors shown in FIGS. 8 and 9 are identical to the concrete floor previously described and shown in FIG. 1 with the exception that a removable wooden insert is provided. In addition, the concrete floors of FIG. 8 have a different number of slats and are integrally joined together in two locations intermediate the opposite ends as compared to a single location intermediate the opposite ends as shown in FIG. 1.

Concrete floor 104 will be now be described it being understood that an identical description applies to concrete floor 106. Likewise, the description of concrete floor 104 is equally applicable to concrete floor 105 with the exception that floor 104 is provided with three longitudinally extending individual slats whereas floor 105 is provided with four individual slats. Referring to FIG. 8, floor 104 includes three individual slats 112, 113 and 114 which extend from end 115 to end 116. Slats 112-114 are identical to slat 11 having a convex top surface with the opposite side surfaces of each slat extending downwardly and converging from the upper convex surface. Slats 112 and 113 are separated by slot 117 whereas slats 113 and 114 are separated by slot 118. The three slats are integrally joined together at ends 115 and 116 providing solid opposite ends of the floor for resting atop the concrete columns shown in FIG. 9.

Figure 10:
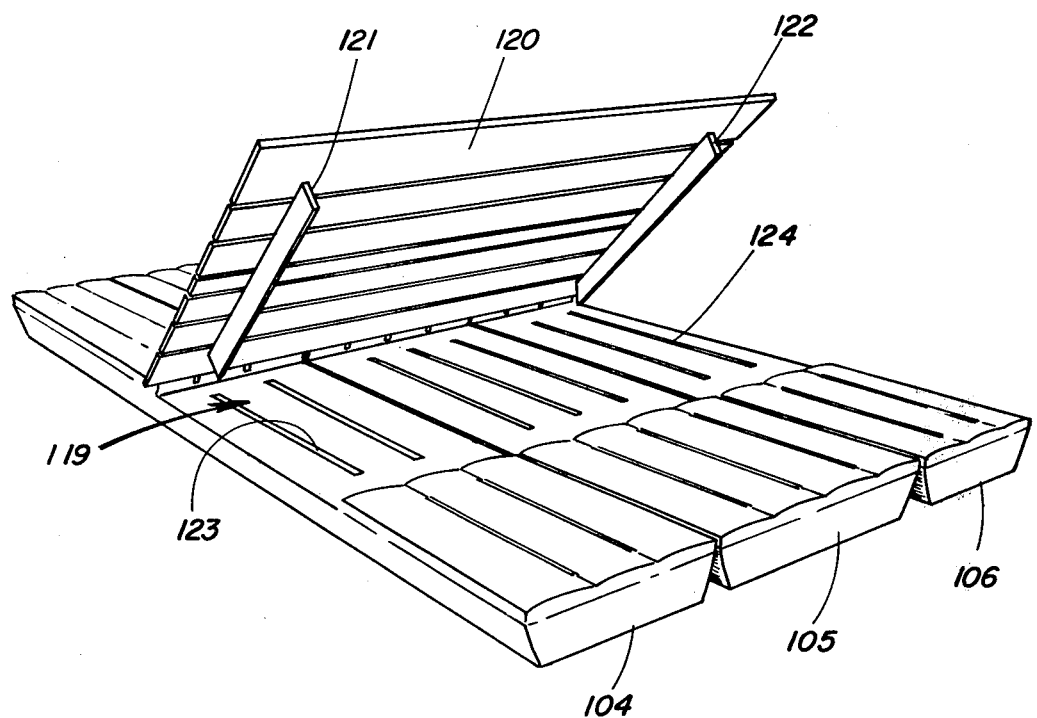
FIG. 10 is a enlarged perspective view of one of the floors of FIG. 9 with the wooden insert being partially removed therefrom.

A recess 119 is provided intermediate the opposite ends 115 and 116 for receiving a wooden insert. Wooden insert 120 is shown in FIG. 10 being partially removed from concrete floors 104-106. Insert 120 includes a plurality of boards mounted atop a pair of runners 121 and 122 which are fittingly received by slots 123 and 124 provided in the recess 119. The runners 121 and 124 are sized to prevent relative movement between the concrete floors and the insert except to the extent that the insert is lifted vertically upward when removed. A single wooden insert is shown as extending across all three floors 104-106; however, it is to be understood that each concrete floor 104-106 may be provided with a separate and aligned wooden insert.

Figure 11:
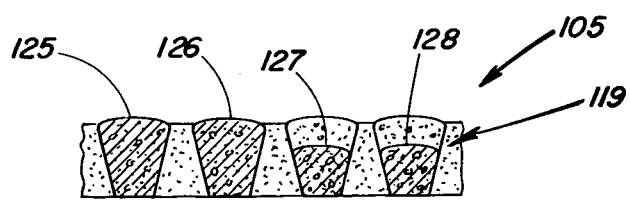
FIG. 11 is a cross-sectional view taken along the line 11—11 of FIG. 8 and viewed in the direction of the arrows.

A cross-sectional view of concrete floor 105 is shown in FIG. 11. Concrete floor 105 is identical to floors 104 and 106 with the exception that four slats 125–128 are provided in floor 105. Slats 125–128 are identical to slab 11 previously described. In FIG. 11, concrete floor 105 is shown in cross section with half of the floor including slats 125 and 126 shown as located outwardly of recess 119 whereas the remaining portion of the floor, including slats 127 and 128, is shown as cross sectioned within recess 119. Slats 127 and 128 have the same convex configured top surface as slats 125 and 126. In addition, each slat 127 and 128 has opposite side surfaces extending downwardly and converging from the convex top surface. Due to the recess 119 and the fact that the top convex surface of each slat 127 and 128 is located downwardly from the top convex surface of slats 125 and 126, the slot located beneath slats 127 and 128 is wider as compared to the slot existing between slats 125 and 126.

Figure 4:
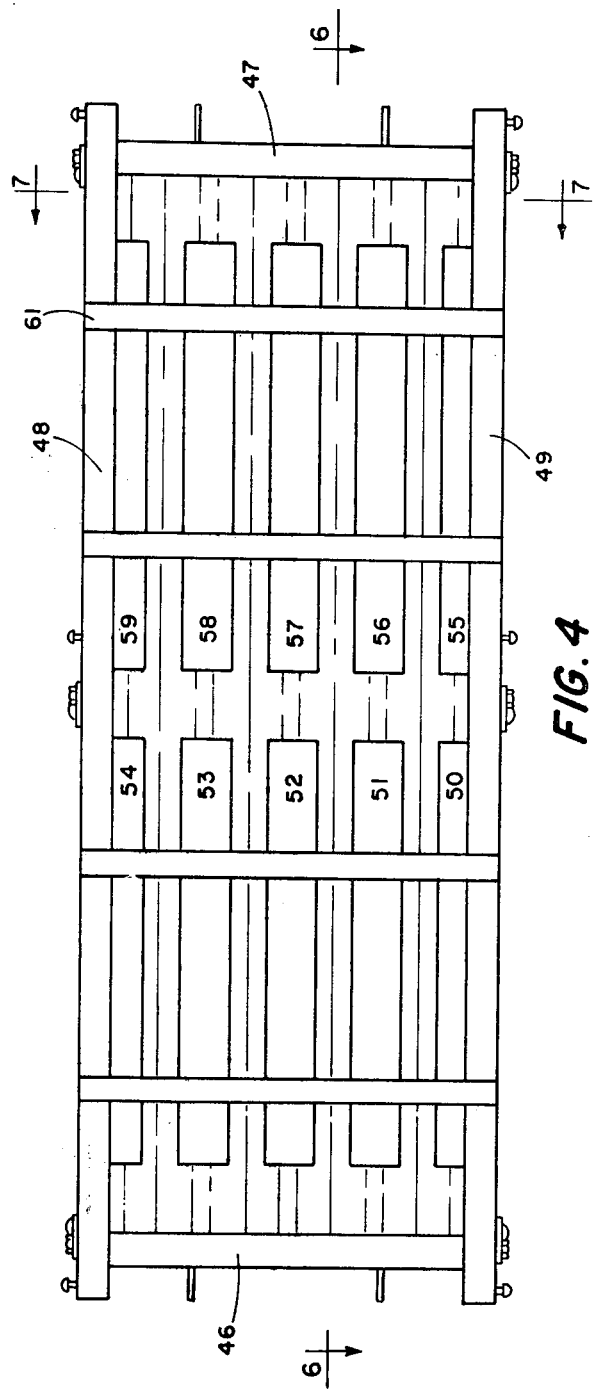
FIG. 4 is a top view of the mold shown in FIG. 3 viewed in the direction of arrows 4—4.
Figure 12:
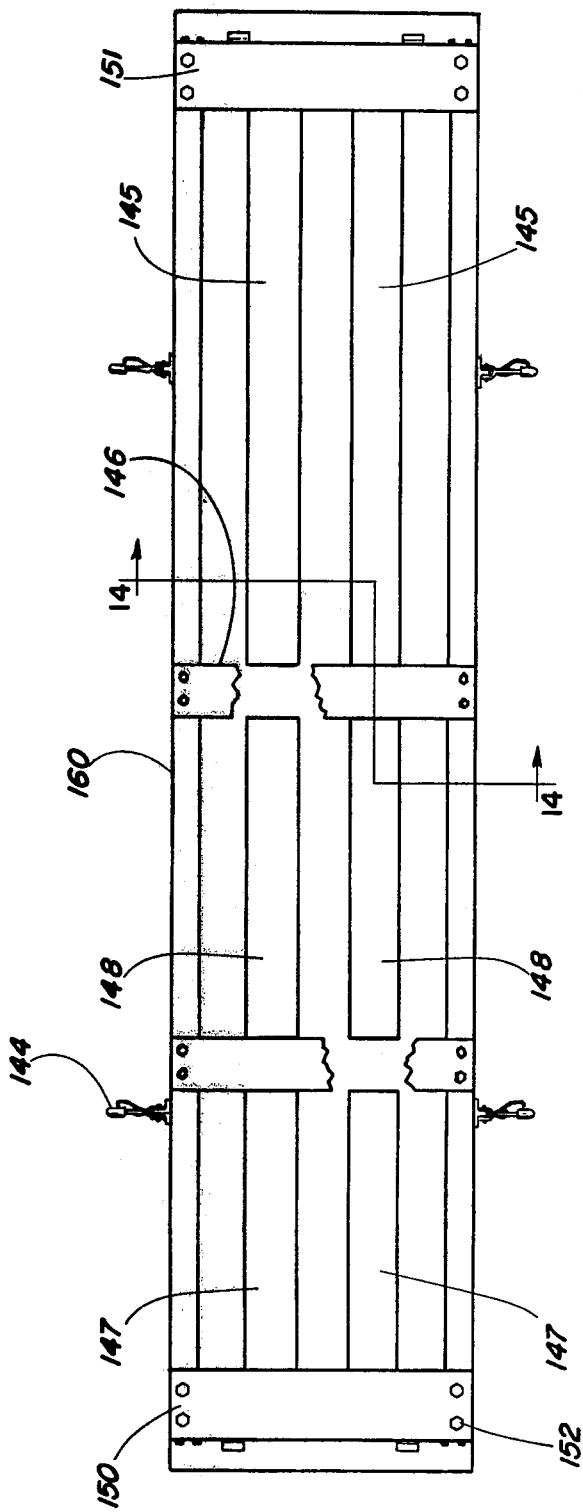
FIG. 12 is a top view of the mold used to produce floor 104 shown in FIG. 8.
Figure 14:
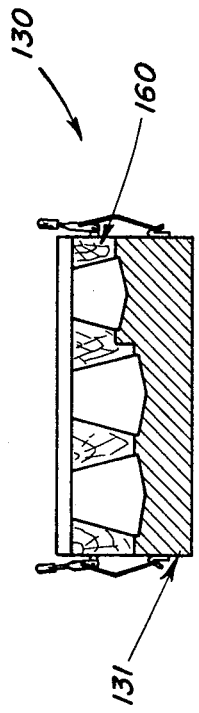
FIG. 14 is a cross-sectional view taken along the line 14—14 of FIG. 12 and viewed in the direction of the arrows.

Mold 130 (FIG. 12) is used to produce concrete floor 104 and is identical to the mold previously described and shown in FIG. 4 with the exception that a means is provided to form the recess 119 in the concrete floor and the separators are aligned in two rows with each row having three separators as compared to the two rows of separators shown in FIG. 4. Additional modifications to the mold will be apparent from the following description.

Mold 130 includes a top part and a bottom part with the bottom part 131 being shown in FIG. 13. Bottom part 131 is provided with a plurality of concave recesses 132–136 identical to the concave recesses 45 previously described. In addition, bottom part 131 is provided with a plurality of ridges 137 which extend between each recess to seatingly receive the separators extending down from the top part of the mold. Intermediate the opposite ends of bottom part 131 is provided a plateau 138 which includes recesses 139, 141 and 142 positioned above but aligned with recesses 132–136. Ridges are provided between recesses 139, 141 and 142 to seatingly receive the separators which extend downwardly from the top part of the mold. As shown in FIG. 13, recesses 139, 141 and 142 are positioned above recesses 132–136 and also above the ridges 137. Once the top part of the mold is mounted atop bottom part 131 in the manner previously described and shown in FIG. 7, the concrete is then poured in, allowed to solidify with the top part of the mold then being removed and with the solidified concrete floor then being turned over. Plateau 138 thereby provides the recess 119. The ridges separating recesses 139, 141 and 142 are wider as compared to ridges 137 thereby providing for wider slots between the slats within recess 119. The wooden insert when resting atop the concrete floor within recess 119 has portions thereof spaced away from the concrete floor due to the convex top surface of the slats within recess 119. Thus, air is allowed to circulate beneath the wooden insert preventing the wooden insert from rapidly rotting.

Downwardly extending brackets 143 are mounted to the side walls of bottom part 131 and lockingly receive conventional clamps 144 (FIG. 12) for locking the top part of the mold to the bottom part. The top part of the mold shown in FIG. 12 includes a plurality of separators 147, 148, 145 and a pair of metal plates 146 having opposite ends bolted to the side walls of the top part of the mold. Plates 146 in the shown embodiment are actually U-shaped channels from which a portion has been removed in order to indicate that the various separators comprise three individual groups. Separators 147 extend beneath locating bracket 150 and are secured thereto by conventional means. The opposite end of separators 147 abut the depending sides of plate 146 and are secured thereto by conventional means. Similarly, separators 148 are secured to plates 146 and separators 145 are secured to plate 146 and to locating bracket 151. Separators 145 and 147 are identical. Separators 148 have the same configuration as separators 145; however, separators 148 are smaller in size than separators 145 since separators 148 abut the top surface or ridges of plateau 138 on the bottom part of the mold.

The locating pins used in the mold shown in FIG. 6 to locate the separators atop the ridges are not utilized in mold 130. Instead, a pair of locating brackets 150 and 151 (FIG. 12) are fixedly secured by fasteners 152 to the opposite ends of the top part of the mold and extend downwardly so as to engage the bottom part of the mold thereby locating the top part with respect to the bottom part of the mold and likewise the separators with respect to the ridges. FIG. 15 is a fragmentary end perspective view of one of the ends of mold 130 showing the bottom part 131 and the top part 160.

Locating bracket 150 will now be described it being understood that a similar description applies to locating bracket 151. Bracket 150 includes a horizontally extending portion 153 fixedly secured by fasteners 152 to the end of top part 160. Bracket 150 also includes a second horizontally extending portion 154 integrally joined by vertically extending portion 155 to the first horizontally extending portion 153. Separators 147 extend beneath the horizontally extending portion 153 of locating bracket 150, but remain spaced apart from vertically extending portion 155. A similar arrangement exists for separator 145 and locating bracket 151 at the opposite end. A downwardly extending lip 155' is integrally attached to portion 154 and is positioned outwardly and adjacent the end of the bottom part 131 of the mold. Both locating brackets have downwardly extending lips 155' so as to engage the opposite ends of the bottom part of the mold thereby locating the top part with respect to the bottom part of the mold and also locating the ridges longitudinally with respect to the separators.

Each locating bracket 150 and 151 is provided with a pair of lifting brackets 180 and 181 (FIG. 15) which are fixedly attached to the vertically extending portion 155 of the locating bracket. The lifting brackets 180 and 181 are hook-shaped extending downwardly to allow a overhead lifting hook to extend downwardly to engage lifting brackets 180 and 181 facilitating removal of the top part 160 from the bottom part 131 of the mold.

Fences or guards are located above the concrete floors to limit movement of the sows during nursing. For example, a pair of side fences 171 are mounted to a pair of parallel and spaced apart end fences 172 and 173. Fences 172 and 173 are fixedly mounted atop the concrete floor and support the side fences 171 which have bottom edges 174 spaced apart from the concrete floor to allow small pigs to walk therebeneath. Thus, the sow may be located between fences 171–173 and may rest atop the wooden insert during nursing. The small pigs may walk beneath the bottom edges 174 thereby facilitating access to the sow for nursing purposes. Fence 172 may be provided with containers of feed to facilitate feeding of the sow. End fence 173 may be provided with a gate to allow the sow to be moved into and out of the fence enclosure. The fence may be produced by any number of conventional means including steel or aluminum rods. Ends 172 and 173 may be either bolted to the floor or secured by conventional means to the building walls. Wall 101 of the building is spaced apart from end fence 173 to allow a person to walk therebetween. The wooden insert may be located equidistant from the opposite ends of the concrete floor; however, in the embodiment shown in FIG. 9, the wooden insert is located closer to end 175 of the concrete floor as compared to end 176. As shown in FIG. 9, fences 171-173 are arranged to position the animal located within the fence enclosure in an area above the wooden insert.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. A farrowing construction comprising:
a plurality of concrete floors adapted to be placed over a pit to support animals, each of said floors having a plurality of concrete slats with first convex top crowns, said slats being spaced apart by slots to allow animal droppings to pass through said slots and with said slats having portions integrally joined to adjacent slats, said floors extending longitudinally across said pit and including upwardly facing sections recessed below said crowns;
insert means removably mounted to said floors and positioned in said sections upon which animals may be located during nursing;
first means located above said floors to limit movement of some of said animals atop said insert means; and
second means cooperating with said insert means and said floors to limit relative movement therebetween, and wherein said floors have opposite ends with said upwardly facing sections located intermediate thereof, said slats extend longitudinally through said sections and have second convex top crowns positioned beneath said first convex top crowns spacing said insert means partially apart from said floors insuring air circulation therebetween.

2. A farrowing construction comprising:
a plurality of concrete floors adapted to be placed over a pit to support animals, each of said floors having a plurality of concrete slats with first convex top crowns, said slats being spaced apart by slots to allow animal droppings to pass through said slots and with said slats having portions integrally joined to adjacent slats, said floors extending longitudinally across said pit and including upwardly facing sections recessed below said crowns;
a plurality of wooden inserts removably mounted to said floors and positioned in said sections upon which animals may be located during nursing;
first means located above said floors to limit movement of some of said animals atop said inserts; and
second means cooperating with said inserts and said floors to limit relative movement therebetween, and wherein said second means includes rails mounted to and beneath said wooden inserts which are fittingly inserted into slots between said slats.

* * * * *